US012112627B2

(12) United States Patent
Fujita

(10) Patent No.: US 12,112,627 B2
(45) Date of Patent: Oct. 8, 2024

(54) BASE STATION, TRAFFIC COMMUNICATION SYSTEM, AND TRAFFIC COMMUNICATION METHOD

(71) Applicant: KYOCERA Corporation, Kyoto (JP)

(72) Inventor: Hiroki Fujita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 359 days.

(21) Appl. No.: 17/707,407

(22) Filed: Mar. 29, 2022

(65) Prior Publication Data

US 2022/0225071 A1 Jul. 14, 2022

Related U.S. Application Data

(63) Continuation of application No. PCT/JP2020/034896, filed on Sep. 15, 2020.

(30) Foreign Application Priority Data

Sep. 30, 2019 (JP) ................................ 2019-178697

(51) Int. Cl.
*G08G 1/0967* (2006.01)

(52) U.S. Cl.
CPC .................................. *G08G 1/0967* (2013.01)

(58) Field of Classification Search
CPC . G08G 1/0967; G08G 1/096783; H04W 4/90; H04W 4/44
See application file for complete search history.

(56) References Cited

U.S. PATENT DOCUMENTS

2007/0109146 A1* 5/2007 Tengler .................. G08G 1/161 340/902

FOREIGN PATENT DOCUMENTS

| | | | | |
|---|---|---|---|---|
| CN | 110349422 A | * 10/2019 | | |
| EP | 4067147 A1 | * 10/2022 | ............ | B60K 31/00 |
| JP | 2018-018214 A | 2/2018 | | |
| JP | 2019-096280 A | 6/2019 | | |
| JP | 2019-114100 A | 7/2019 | | |
| RU | 2700319 C1 | * 9/2019 | | |
| WO | WO-2019144511 A1 | * 8/2019 | ............ | G07C 5/008 |

OTHER PUBLICATIONS

Minato et al., "Back light ration in rectangular area when moving horizontal direction", The Abstract of the 2016 Spring National Conference of Operations Research Society of Japan, Apr. 11, 2016, pp. 313-314.

* cited by examiner

*Primary Examiner* — Kevin Kim
(74) *Attorney, Agent, or Firm* — Studebaker & Brackett PC

(57) ABSTRACT

A base station 200 is installed around a road. The base station 200 includes a controller 22 and a communicator 21. The controller 22 is configured to acquire weather condition information indicating a weather condition on the road, and to estimate a risk level of occurrence of a traffic accident on the road based on the weather condition information. The communicator 21 is configured to transmit, to a vehicle 100 on the road, a warning message including information based on the risk level estimated.

16 Claims, 5 Drawing Sheets

BASE STATION, TRAFFIC COMMUNICATION SYSTEM, AND TRAFFIC COMMUNICATION METHOD

RELATED APPLICATIONS

The present application is a continuation based on PCT Application No. PCT/JP2020/034896, filed on Sep. 15, 2020, which claims the benefit of Japanese Patent Application No. 2019-178697 filed on Sep. 30, 2019. The content of which is incorporated by reference herein in their entirety.

TECHNICAL FIELD

The present disclosure relates to a base station, a traffic communication system, and a traffic communication method.

BACKGROUND ART

In recent years, Intelligent Transport Systems (ITSs) have attracted attention as a technology enabling a reduction in the risk of traffic accidents. In such an intelligent transport system, roadside devices are used that correspond to base stations provided near roads.

Patent Literature 1 describes an apparatus that estimates a risk level indicating the probability of a traffic accident on a road section based on traffic condition indexes for the road section and that transmits, in response to determining that the estimated risk level is higher than or equal to a predetermined reference value, alert information to at least one of an in-vehicle device mounted on a vehicle located in the road section or a mobile terminal carried by a pedestrian. In this regard, the traffic condition indexes include traffic volume, traffic density, and average speed.

CITATION LIST

Patent Literature

Patent Literature 1: JP 2018-018214 A

SUMMARY

A base station according to a first aspect is installed around a road. The base station includes a controller and a communicator. The controller is configured to acquire weather condition information indicating a weather condition on the road, and to estimate a risk level of occurrence of a traffic accident on the road based on the weather condition information. The communicator is configured to transmit, to a vehicle on the road, a warning message including information based on the risk level estimated.

A traffic communication system according to a second aspect includes a vehicle and the base station according to the first aspect.

A traffic communication method according to a third aspect is a traffic communication method used in a base station installed around a road. The traffic communication method includes acquiring weather condition information indicating a weather condition on the road, estimating a risk level of occurrence of a traffic accident on the road based on the weather condition information, and transmitting, to a vehicle on the road, a warning message including information based on the risk level estimated.

DESCRIPTION OF EMBODIMENTS

Even the method described in Patent Literature 1 has room for improvement.

Thus, an object of the present disclosure is to enable provision of a safe and secure intelligent transport system.

A traffic communication system according to an embodiment will be described with reference to the drawings. Note that in the following description of the drawings, identical or similar components will be denoted by identical or similar reference signs.

Configuration of Traffic Communication System

Figure 1:
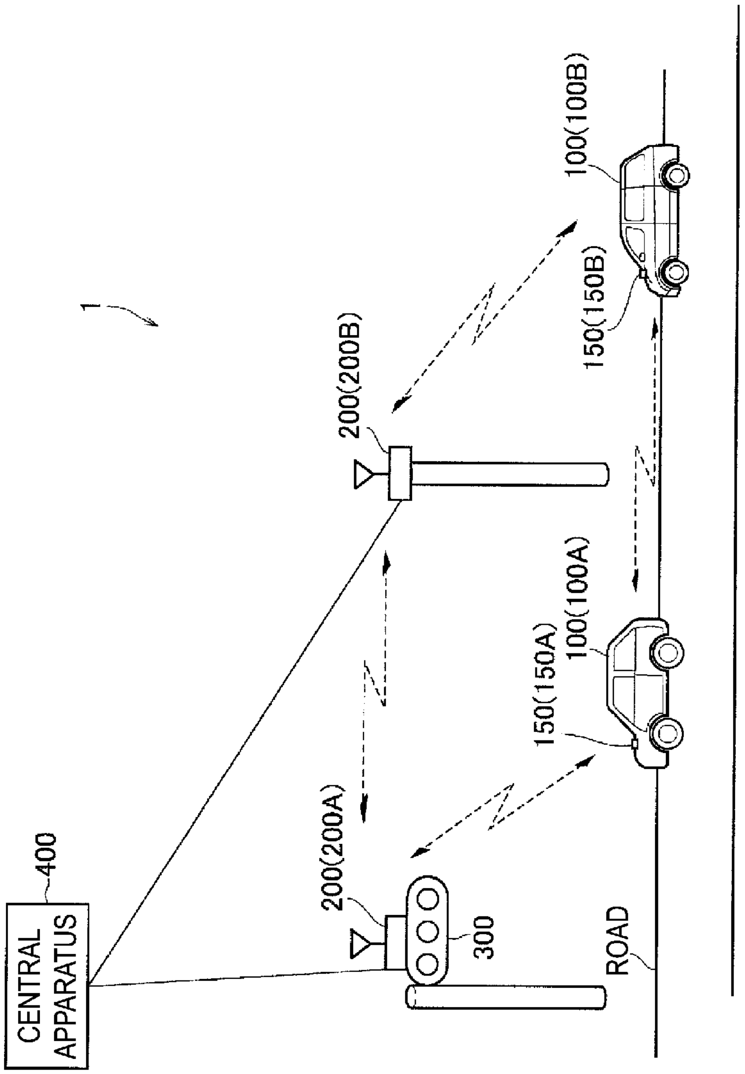
FIG. 1 is a diagram illustrating a configuration of a traffic communication system 1 according to an embodiment.

First, a configuration of a traffic communication system according to an embodiment will be described. FIG. 1 is a diagram illustrating a configuration of a traffic communication system 1 according to an embodiment.

As illustrated in FIG. 1, the traffic communication system 1 includes vehicles 100 passing through a road and roadside devices 200 used as base stations installed on a roadside corresponding to the periphery of the road. In FIG. 1, vehicles 100A and 100B are illustrated as the vehicles 100, and roadside devices 200A and 200B are illustrated as the roadside devices 200. Note that the vehicles 100 are illustrated as an automobile such as an ordinary automobile and a light automobile, but may be any vehicle passing through a road, for example, a two-wheel motor vehicle (motorcycle) or the like.

An in-vehicle device 150 performing wireless communication is mounted on each of the vehicles 100. The in-vehicle device 150 performs roadside-to-vehicle communication with the roadside devices 200.

The roadside devices 200 are installed around the road. The roadside devices 200 may be installed at intersections on an ordinary road, or on the roadside of an expressway, but a case will hereinafter mainly be described in which the roadside devices 200 are installed around intersections. Note that the roadside devices 200 may be installed around a road at locations different from the intersections.

In the example illustrated in FIG. 1, the roadside device 200A is installed on a traffic light (traffic signal light) 300 or a pole of the traffic light and operates in conjunction with the traffic light 300. For example, the roadside device 200A transmits, to the vehicle 100 (in-vehicle device 150), a radio signal including signal information related to the traffic light 300.

For such roadside-to-vehicle communication, wireless communication may be used that is based on broadcasting for a large number of unspecified destinations. Alternatively, the roadside-to-vehicle communication may use wireless communication that is based on multicast for a large number of specified destinations, or unicast wireless communication for a single specified destination.

Each roadside device 200 is connected to a central apparatus 400 via a communication line. The central apparatus

400 manages road features such as the position of a road, the height above sea level of the road, the gradient of the road.

Configuration of Roadside Device

Figure 2:
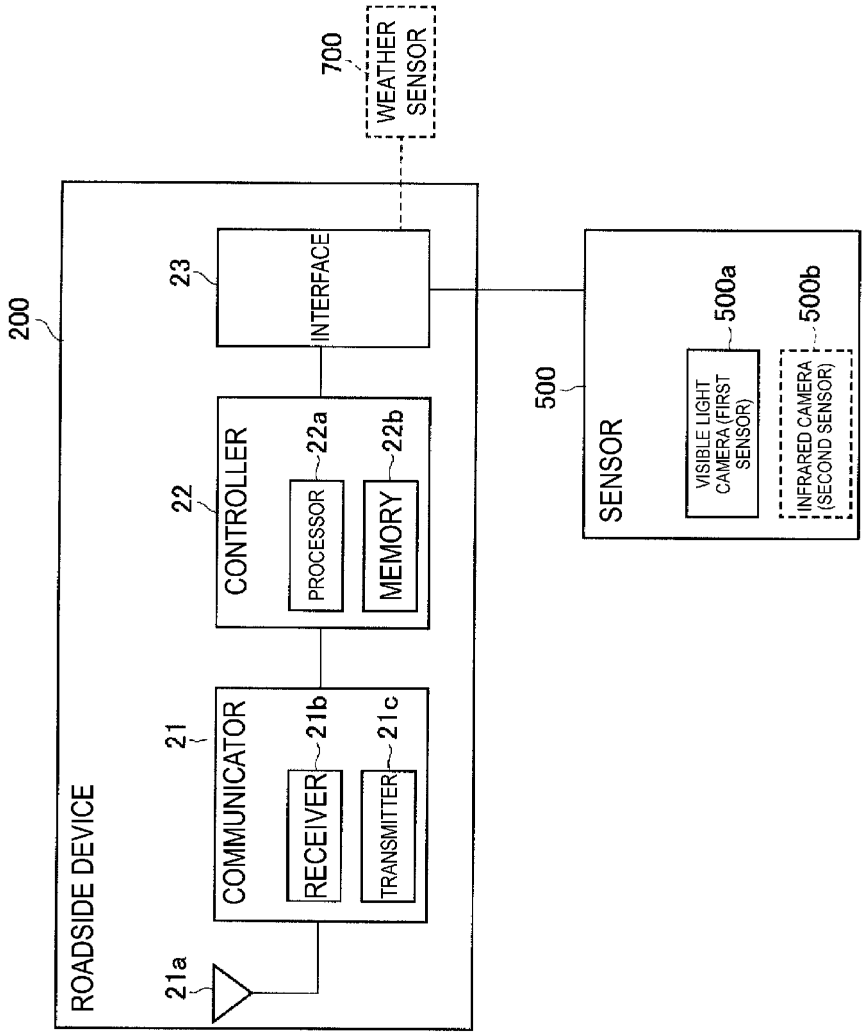
FIG. 2 is a diagram illustrating a configuration of a roadside device 200 according to an embodiment.

Now, a configuration of the roadside device 200 according to an embodiment will be described. FIG. 2 is a diagram illustrating a configuration of the roadside device 200 according to an embodiment.

As illustrated in FIG. 2, the roadside device 200 includes a communicator 21, a controller 22, and an interface 23.

The communicator 21 includes an antenna 21*a*, a receiver 21*b*, and a transmitter 21*c*, and performs wireless communication via the antenna 21*a*. The communicator 21 performs roadside-to-vehicle communication with the vehicle 100 (in-vehicle device 150). As described above, the roadside-to-vehicle communication may be performed by unicast, broadcast, or multicast.

The antenna 21*a* may be a non-directional antenna, or may be a directional antenna having directivity. The antenna 21*a* may be an adaptive array antenna that can dynamically change its directivity.

The communicator 21 includes a receiver 21*b* that converts a radio signal received by the antenna 21*a* into receive data and outputs the receive data to the controller 22. Additionally, the communicator 21 includes a transmitter 21*c* that converts the receive data output by the controller 22 into a radio signal and transmits the radio signal from the antenna 21*a*.

The wireless communication scheme of the communicator 21 may be a scheme conforming to the T109 standard of the Association of Radio Industries and Businesses (ARIB), a scheme conforming to the Vehicle-to-everything (V2X) standard of the Third Generation Partnership Project (3GPP), and/or a scheme conforming to a wireless Local Area Network (LAN) standard such as the Institute of Electrical and Electronics Engineers (IEEE) 802.11 series. The communicator 21 may be configured to be capable of conforming to all of these communication standards.

The controller 22 controls various functions of the roadside device 200. The controller 22 includes at least one memory 22*b* and at least one processor 22*a* electrically connected to the memory 22*b*. The memory 22*b* includes a volatile memory and a non-volatile memory and stores information used for processing in the processor 22*a* and programs executed by the processor 22*a*. The processor 22*a* executes the programs stored in the memory 22*b* to perform various processing operations.

The interface 23 is connected to a sensor 500 in a wired or wireless manner. The sensor 500 detects a mobile body on the road, in particular a pedestrian. In an embodiment, the sensor 500 includes a plurality of sensors. Each of the sensors may be any sensor as long as the sensor can sense a mobile body on a road, and may be at least one of an image sensor (roadside camera), a millimeter wave sensor, an ultrasound sensor, or an infrared sensor.

For example, each of the sensors is a roadside camera installed on the roadside. FIG. 2 illustrates an example in which the sensor 500 includes a plurality of roadside cameras (visible light camera 500*a* and infrared camera 500*b*). The roadside camera captures an image of a road. The roadside camera outputs the captured image to the controller 22 via the interface 23.

FIG. 2 illustrates an example in which the roadside camera is configured separately from the roadside device 200. However, the roadside camera may be configured integrally with the roadside device 200.

The roadside camera may include a visible light camera 500*a* and an infrared camera 500*b*. The roadside camera may include only a visible light camera 500*a*. An infrared camera is a camera that captures infrared light radiated from an object to be imaged. A known infrared camera is adopted for the infrared camera 500*b*.

The interface 23 may be connected to a weather sensor 700. The weather sensor 700 may be any sensor for sensing weather conditions. For example, the weather sensor 700 includes at least one of an insolation sensor, a rain sensor, a fog sensor, or an air pollution sensor. Insolation sensors for respective directions may be provided.

Additionally, the interface 23 may be connected to the central apparatus 400. Furthermore, the interface 23 may be connected to the Internet.

In the roadside device 200 configured as described above, the controller 22 acquires weather condition information indicating weather conditions on the road by using the weather sensor 700. The controller 22 may acquire the weather condition information by means other than the weather sensor 700. The controller 22 estimates the risk level of occurrence of a traffic accident on the road at least based on the weather condition information. In this regard, in order to estimate the risk level, the controller 22 may acquire other information for estimating the risk level (vehicle movement direction information, intersection information, pedestrian information, and/or the like described below). In this case, the controller 22 may estimate the risk level based on the weather condition information and the other information. Then, the communicator 21 transmits a warning message including information based on the estimated risk level in step S13.

As described above, by estimating the risk level of occurrence of a traffic accident on the road based on the weather condition information, the estimation accuracy of the probability (risk level) of a traffic accident can be enhanced.

Configuration of Vehicle

Figure 3:
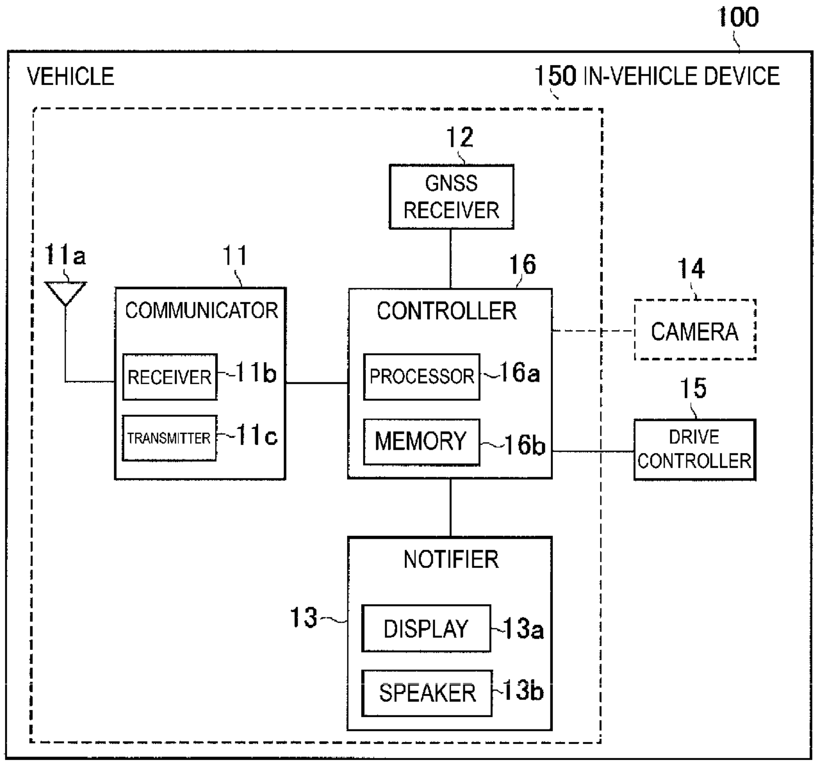
FIG. 3 is a diagram illustrating a configuration of a vehicle 100 according to an embodiment.

Now, a configuration of the vehicle 100 according to an embodiment will be described. FIG. 3 is a diagram illustrating a configuration of the vehicle 100 according to an embodiment.

As illustrated in FIG. 3, the vehicle 100 includes a communicator 11, a Global Navigation Satellite System (GNSS) receiver 12, a notifier 13, at least one camera 14, a drive controller 15, and a controller 16.

The communicator 11 includes an antenna 11*a*, a receiver 11*b*, and a transmitter 11*c*, and performs wireless communication via the antenna 11*a*. The communicator 11 performs roadside-to-vehicle communication with the roadside device 200. As described above, the roadside-to-vehicle communication may be performed by unicast, broadcast, or multicast.

The communicator 11 includes the receiver 11*b* that converts a radio signal received by the antenna 11*a* into receive data and outputs the receive data to the controller 16. Additionally, the communicator 11 includes the transmitter 11*c* that converts transmit data output by the controller 16 into a radio signal and transmits the radio signal from the antenna 11*a*.

The radio communication scheme of the communicator 11 may be a scheme conforming to the T109 standard of the ARIB, a scheme conforming to the V2X standard of the 3GPP, and/or a scheme conforming to a wireless LAN standard such as the IEEE 802.11 series. The communicator 11 may be configured to be capable of conforming to all of these communication standards.

The GNSS receiver 12 performs positioning based on GNSS satellite signals, and outputs, to the controller 16, GNSS position information indicating the current geographical position (latitude and longitude) of the vehicle 100.

Under the control of the controller 16, the notifier 13 notifies the driver of the vehicle 100 of information. The notifier 13 includes a display 13*a* that displays information, and a speaker 13*b* that auditorily outputs information.

The camera 14 is a camera mounted on the vehicle 100. The camera 14 may include a front camera that captures an image of the front of the vehicle. The camera 14 outputs the captured image to the controller 16. The vehicle 100 need not include the camera 14.

The drive controller 15 controls an engine or a motor as a source of power, a power transmission mechanism, brakes, and the like. In a case where the vehicle 100 is a self-driving vehicle, the drive controller 15 may control drive of the vehicle 100 in cooperation with the controller 16.

The controller 16 controls various functions of the vehicle 100 (in-vehicle device 150). The controller 16 includes at least one memory 16*b* and at least one processor 16*a* electrically connected to the memory 16*b*. The memory 16*b* includes a volatile memory and a non-volatile memory and stores information used for processing in the processor 16*a* and programs executed by the processor 16*a*. The processor 16*a* executes the programs stored in the memory 16*b* to perform various processing operations.

In the vehicle 100 configured in this manner, in response to the communicator 11 receiving a warning message from the roadside device 200, based on the warning message, the controller 16 may perform self-driving control (e.g., deceleration) of the vehicle 100 or may provide notification to the driver.

The probability (risk level) of a traffic accident also varies depending on the weather conditions as well as the traffic volume, traffic density, and average speed. For example, even with a low traffic volume, a low traffic density, and a low average speed, the probability of a traffic accident is considered to be high in a case where the evening sun is shining or when there is a fog. Accordingly, the known art has room for improvement in an enhancement of the estimated accuracy of the probability of a traffic accident.

Operations of Roadside Device

Figure 4:
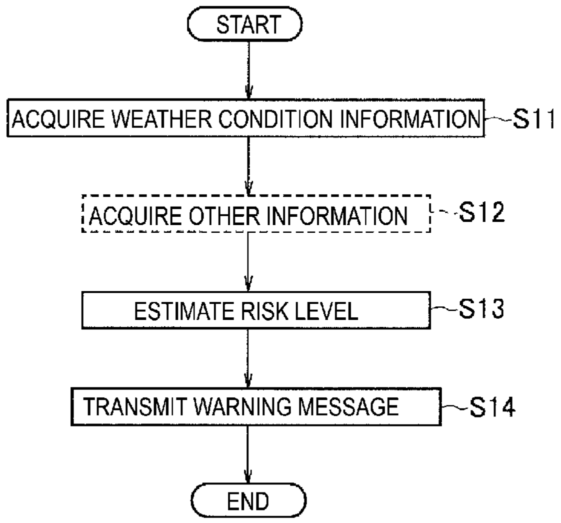
FIG. 4 is a diagram illustrating operations of the roadside device 200 according to an embodiment.

Operations of the roadside device 200 according to an embodiment will now be described. FIG. 4 is a diagram illustrating operations of the roadside device 200 according to an embodiment.

1. Step S11

As illustrated in FIG. 4, in step S11, the controller 22 acquires weather condition information indicating the weather conditions on the road. The weather condition information may include weather phenomenon information indicating the condition of the weather phenomenon on the road and insolation direction information indicating the direction of insolation to the vehicle on the road (hereinafter simply referred to as "insolation direction").

1.1. Acquisition of Weather Phenomenon Information

The weather phenomenon includes rain, fog, air pollution, and the like. The air pollution includes photochemical smog, microparticulate matter (so-called PM2.5), and the like. The weather phenomenon information may include fog information indicating the fog density, rain information indicating the amount of rainfall, and air pollutant information indicating the concentration of air pollutants. The controller 22 may acquire the weather phenomenon information from the weather sensor 700. The controller 22 may acquire the weather phenomenon information via the Internet. The controller 22 may recognize the weather phenomenon by using the image recognition method based on the captured image obtained by the roadside camera, acquiring the weather phenomenon information.

1.2. Acquisition of Insolation Direction Information

The controller 22 may identify the insolation direction by using the insolation sensor, or may estimate the insolation direction by using insolation direction estimation information without using the insolation sensor. In the former case, the controller 22 acquires insolation direction information from the insolation sensor. In the latter case, the controller 22 acquires, as insolation direction information, information indicating the estimated insolation direction.

The insolation direction estimation information includes information indicating the current time, and road position information indicating the position of the road (e.g., the longitude and latitude of the representative point on the road). The controller 22 may acquire information indicating the current time from the clock provided in the roadside device 200, or may acquire, via the Internet, information indicating the current time. The controller 22 may acquire road position information from the central apparatus 400, or may acquire road position information stored in the memory 22*b* when the roadside device 200 is initially installed.

Figure 5:
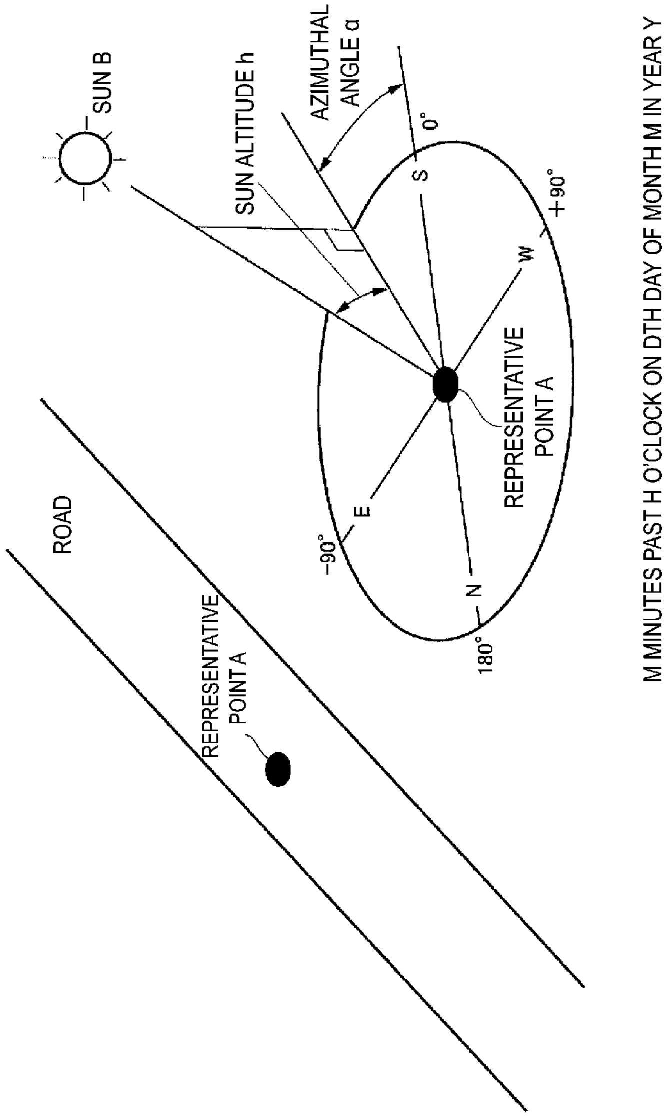
FIG. 5 is a diagram illustrating an example of a method for estimating an insolation direction according to an embodiment.

FIG. 5 is a diagram illustrating an example of a method for estimating the insolation direction based on insolation direction estimation information according to an embodiment. As illustrated in FIG. 5, the controller 22 identifies the position of the road (the longitude and latitude of the representative point A on the road) from the road position information acquired, identifies the current time (M minutes past H o'clock on Dth day of month M in year Y) from the clock, and applies a known calculation method to identify the altitude h and the azimuthal angle $\alpha$ of the sun corresponding to the road position (representative point A). Then, the controller 22 determines the direction identified by the altitude h and the azimuthal angle $\alpha$ of the sun (the direction indicated by a straight line drawn from the sun B to the representative point A in FIG. 5) to be the direction of insolation.

The insolation direction estimation information may further include information indicating the height above sea level of the road and information indicating the gradient of the road. The controller 22 may correct, based on the height above sea level and the gradient of the road, the direction identified by the altitude and the azimuthal angle of the sun corresponding to the position of the road, and identify the corrected direction as the direction of insolation. This allows identification of a more accurate direction of insolation. The information indicating the height above sea level of the road and information indicating the gradient of the road may be pre-stored in the memory 22*b* when the roadside device 200 is initially installed. The controller 22 may acquire, from the central apparatus 400, information indicating the height above sea level of the road and information indicating the gradient of the road.

2. Step S12

In step S12, the controller 22 acquires other information for estimating the risk level (vehicle movement direction information, intersection information, pedestrian information, and the like described below).

The vehicle movement direction information is information indicating the movement direction of the vehicle 100. The controller 22 identifies the movement direction of the vehicle 100 by using the communicator 21 to receive a notification message from the vehicle 100. The notification message may include information indicating the movement direction of the vehicle 100, or may include information indicating the position (longitude and latitude) of the vehicle 100. The controller 22 may identify the movement direction of the vehicle 100 by periodically receiving information indicating the position (longitude and latitude) of the vehicle 100. Additionally, the controller 22 may identify the movement direction of the vehicle 100 without using the notification message. For example, in a case where the road is for one-way traffic, the direction faced by the road may be identified as the movement direction of the vehicle 100 on the road.

The controller 22 acquires intersection information indicating whether the roadside device 200 is installed around an intersection. The intersection information may be pre-stored in the memory 22*b* when the roadside device 200 is initially installed. The controller 22 may acquire intersection information from the central apparatus 400.

The controller 22 acquires the captured image acquired by the sensor 500, and acquires pedestrian information from the captured image. The pedestrian information includes information indicating the number of pedestrians, information indicating whether the pedestrians include any child or elderly person, and information indicating whether the pedestrians include a person operating a mobile device (such as a smartphone). For example, the controller 22 can extract at least one of a characteristic contour, a characteristic color, or a characteristic luminance of an object to be imaged based on the captured image obtained by the roadside camera, and identify the object to be imaged based on the extracted information. As this identification technique, any known technique may be used. According to such an identification technique, the controller 22 identifies pedestrians from the captured image, determines the number of identified pedestrians, determines whether any of the pedestrians is a child or an elderly person, and determines whether any of the pedestrians is operating a mobile device. Then, the controller 22 acquires, by such identification and determination processing, information indicating the number of pedestrians, information indicating whether the pedestrians include any child or elderly person, and information indicating whether the pedestrians include a person operating a mobile device.

Basically, the controller 22 acquires pedestrian information from the captured image obtained by the visible light camera 500*a*, but may select the infrared camera 500*b* between the visible light camera 500*a* and the infrared camera 500*b* based on the weather condition information, and may acquire the pedestrian information from the captured image obtained by the infrared camera 500*b*. For example, in a case where the fog density is higher than or equal to a predetermined value, the infrared camera 500*b* is selected. In this regard, the “fog density” may be interpreted as any one of the “amount of rainfall” or the “concentration of air pollutants”. With the fog density increased, visible light from the object to be imaged is blocked by the fog, and a reduced amount of visible light can enter the visible light camera 500*a*, degrading the quality of the captured image obtained by the visible light camera 500*a*. This may prevent the pedestrians from being identified. On the other hand, infrared light has a high permeability with respect to the fog and the like, and thus even with the fog density increased, the image quality of the captured image obtained by the infrared camera 500*b* is prevented from being degraded, allowing the pedestrians to be identified. Furthermore, the mobile device generates heat during operation, and thus when whether the pedestrians include a person operating a mobile device is determined, a more accurate determination can be made by using the captured image obtained by the infrared camera 500*b*.

The controller 22 may acquire pedestrian information by image recognition based on both the captured image obtained by the visible light camera 500*a* and the captured image obtained by the infrared camera 500*b*.

3. Step S13

In step S13, the controller 22 estimates the risk level of occurrence of a traffic accident on the road based on each item identified by the weather condition information, vehicle movement direction information, intersection information, and pedestrian information. Such items include the fog density, the concentration of air pollutants, the amount of rainfall, the relationship between the insolation direction and the vehicle movement direction, whether the roadside device 200 is installed around the intersection, the number of pedestrians, whether the pedestrians include a child or an elderly person, and whether the pedestrians include a person operating a mobile device.

In a case where information of a plurality of items is available, the controller 22 may estimate item-by-item risk levels, and estimate the overall risk level based on the risk levels for the respective items. The risk level may be a value. A larger value may indicate a higher risk level, and a smaller value may indicate a lower risk level.

3.1. Method for Estimating Risk Level for Each Item

For example, the controller 22 estimates a value for the risk level as follows.

The controller 22 estimates a large value for the risk level depending on the insolation direction.

The controller 22 associates the fog density with the risk level, and a larger value for the risk level is estimated for a higher fog density.

The controller 22 associates the concentration of air pollutants with the risk level, and a larger value for the risk level is estimated for a higher concentration of air pollutants.

The controller 22 associates the amount of rainfall with the risk level, and a larger value for the risk level is estimated for a larger amount of rainfall.

The controller 22 estimates a larger value for the risk level for a case where the movement direction of the vehicle 100 and the direction of insolation are opposite to each other than for a case where the movement direction of the vehicle 100 and the direction of insolation are not opposite to each other. In a case where the movement direction of the vehicle 100 and the direction of insolation are opposite to each other, the eyes of the driver of the vehicle 100 are exposed to sunlight through the windshield of the vehicle 100, and thus an obstacle, a mobile body, or the like on the road may be invisible to the driver. Accordingly, a larger value for the risk level is estimated for a case where the movement direction of the vehicle 100 and the direction of insolation are opposite to each other than for a case where the movement direction of the vehicle 100 and the direction of insolation are not opposite to each other. In this regard, a first risk level refers to the risk level estimated for a case where the movement direction of the vehicle and the direction of insolation are not opposite to each other, and a second risk level higher than the first risk level refers to the risk level estimated for a case where the movement direction of the vehicle and the direction of insolation are opposite to each other.

The controller 22 estimates a larger value for the risk level for a case where the roadside device 200 is installed around the intersection than for a case where the roadside device 200 is not installed around the intersection. In this regard, a third risk level refers to the risk level estimated for a case where the roadside device 200 is not installed around the intersection, and a fourth risk level higher than the third risk level refers to the risk level estimated for a case where the roadside device 200 is installed around the intersection.

The controller 22 estimates a larger value for the risk level for a larger number of pedestrians.

The controller 22 estimates a larger value for the risk level for a case where the pedestrians include a child or an elderly person than for case where the pedestrians include no child or elderly person.

The controller 22 estimates a larger value for the risk level for a case where the pedestrians include a person operating a mobile device than for a case where the pedestrians include no person operating a mobile device.

3.2. Method for Estimating Overall Risk Level

The controller 22 estimates the overall risk level based on the risk levels for the respective items described above.

The controller 22 may estimate the overall risk level by adding the risk levels for the respective items together. The controller 22 may estimate the overall risk level by weighting the item-by-item risk levels and adding the weighted risk levels together.

4. Step S14

In step S14, the communicator 21 transmits a warning message including information based on the risk level estimated in step S13.

The warning message may include a numerical value indicating the estimated risk level itself. The warning message may also include information calling for attention which information is generated based on the estimated risk level.

The communicator 21 may determine whether to transmit the warning message based on the result of a comparison between the estimated risk level and a threshold. For example, the communicator 21 may determine not to transmit the warning message in a case where the estimated risk level is lower than or equal to the threshold. This allows frequent issuance of the warning message with low risk level to be avoided.

Also, the warning message need not necessarily mean a message notified in order to raise alert but may be used as a message for notifying information as needed.

The communicator 21 transmits the warning message to the vehicle 100 by unicast, broadcast, or multicast.

In response to estimation of an item-by-item risk level corresponding to the direction of insolation during estimation of the risk level, the communicator 21 may transmit the warning message to the vehicle 100 corresponding to the movement direction of the vehicle 100 used in estimating the item-by-item risk level. For example, the notification message identifying the movement direction of the vehicle includes information identifying the transmission source of the notification message, and the communicator 21 transmits the warning message to a destination corresponding to the transmission source identified based on the notification message.

In response to the warning message received, the in-vehicle device 150 may perform self-driving control (e.g., deceleration or stoppage) of the vehicle 100, or may provide notification to the driver.

The in-vehicle device 150 may control the speed of the vehicle 100 in accordance with the warning message received. The in-vehicle device 150 may change the speed according to the value of the risk level in the warning message. For example, the speed corresponding to the value of the risk level is predetermined, and the in-vehicle device 150 provides control via the drive controller 15 such that the speed corresponds to the value of the risk level. Before the roadside device 200 transmits the warning message, the roadside device 200 may include, in the warning message, the speed information corresponding to the value of the risk level, and in response to receiving the warning message, the in-vehicle device 150 may change the speed in accordance with the speed information included in the warning message. In such a configuration, the speed of the vehicle 100 is controlled in accordance with the risk level sensed by the roadside device 200, and thus a safe and secure intelligent transport system can be provided.

OTHER EMBODIMENTS

A program may be provided that causes a computer to execute each of the processing operations performed by the in-vehicle device 150 or the roadside device 200. The program may be recorded in a computer-readable medium. Use of the computer-readable medium enables the program to be installed on a computer. Here, the computer-readable medium on which the program is recorded may be a non-transitory recording medium. The non-transitory recording medium is not particularly limited and may be, for example, a recording medium such as a CD-ROM or a DVD-ROM.

In addition, circuits for executing the processing to be performed by the in-vehicle device 150 or the roadside device 200 may be integrated, and at least part of the in-vehicle device 150 or the roadside device 200 may be configured as a semiconductor integrated circuit (a chipset or an SoC).

Embodiments have been described above in detail with reference to the drawings, but specific configurations are not limited to those described above, and various design modifications can be made without departing from the gist of the present disclosure.

The invention claimed is:

1. A base station installed around a road, the base station comprising:

a controller configured to acquire weather condition information indicating a weather condition on the road, and to estimate a risk level of occurrence of a traffic accident on the road based on the weather condition information; and a communicator configured to transmit, to a vehicle on the road, a warning message including information based on the risk level estimated, wherein the weather condition information includes insolation direction information indicating a direction of insolation to the vehicle on the road, and the controller is configured to estimate the risk level based on the insolation direction information.

2. The base station according to claim 1, wherein the weather condition information includes weather phenomenon information indicating a condition of a weather phenomenon on the road, the controller is configured to estimate the risk level based on the weather phenomenon information, and the weather phenomenon includes at least one of rain, fog, or air pollution.

3. The base station according to claim 1, wherein the controller is configured to estimate the risk level further based on intersection information indicating whether the base station is installed around an intersection.

4. The base station according to claim 3, wherein
the controller is configured to
estimate a third risk level as the risk level in a case where the base station is not installed around the intersection, and
estimate, as the risk level, a fourth risk level higher than the third risk level in a case where the base station is installed around the intersection.

5. A traffic communication system comprising:
a vehicle; and
the base station according to claim 1.

6. A base station installed around a road, the base station comprising:
a controller configured to acquire weather condition information indicating a weather condition on the road, and to estimate a risk level of occurrence of a traffic accident on the road based on the weather condition information; and
a communicator configured to transmit, to a vehicle on the road, a warning message including information based on the risk level estimated, wherein
the weather condition information includes insolation direction information indicating a direction of insolation to the vehicle on the road,
the controller is configured to estimate the risk level based on the insolation direction information,
the communicator is configured to receive a notification message from the vehicle on the road, and
the controller is configured to
estimate a first risk level as the risk level in a case where a movement direction of the vehicle on the road identified based on the notification message and the direction of insolation are not opposite to each other, and
estimate, as the risk level, a second risk level higher than the first risk level in a case where the movement direction and the direction of insolation are opposite to each other.

7. A traffic communication system comprising:
a vehicle; and
the base station according to claim 6.

8. The base station according to claim 6, wherein
the weather condition information includes weather phenomenon information indicating a condition of a weather phenomenon on the road,
the controller is configured to estimate the risk level based on the weather phenomenon information, and
the weather phenomenon includes at least one of rain, fog, or air pollution.

9. The base station according to claim 6, wherein
the controller is configured to estimate the risk level further based on intersection information indicating whether the base station is installed around an intersection.

10. The base station according to claim 9, wherein
the controller is configured to
estimate a third risk level as the risk level in a case where the base station is not installed around the intersection, and
estimate, as the risk level, a fourth risk level higher than the third risk level in a case where the base station is installed around the intersection.

11. A base station installed around a road, the base station comprising:
a controller configured to acquire weather condition information indicating a weather condition on the road, and to estimate a risk level of occurrence of a traffic accident on the road based on the weather condition information;
a communicator configured to transmit, to a vehicle on the road, a warning message including information based on the risk level estimated; and
an interface connected to a plurality of sensors for sensing a mobile body on the road, wherein
the plurality of sensors includes an infrared camera, and
the controller is configured to
select the infrared camera among the plurality of sensors based on the weather condition information, and
to estimate the risk level further based on a captured image obtained by the infrared camera.

12. A traffic communication system comprising:
a vehicle; and
the base station according to claim 11.

13. The base station according to claim 11, wherein
the weather condition information includes weather phenomenon information indicating a condition of a weather phenomenon on the road,
the controller is configured to estimate the risk level based on the weather phenomenon information, and
the weather phenomenon includes at least one of rain, fog, or air pollution.

14. The base station according to claim 11, wherein
the controller is configured to estimate the risk level further based on intersection information indicating whether the base station is installed around an intersection.

15. The base station according to claim 14, wherein
the controller is configured to
estimate a third risk level as the risk level in a case where the base station is not installed around the intersection, and
estimate, as the risk level, a fourth risk level higher than the third risk level in a case where the base station is installed around the intersection.

16. A traffic communication method used in a base station installed around a road, the traffic communication method comprising:
acquiring weather condition information indicating a weather condition on the road;
estimating a risk level of occurrence of a traffic accident on the road based on the weather condition information; and
transmitting, to a vehicle on the road, a warning message including information based on the risk level estimated, wherein
the weather condition information includes insolation direction information indicating a direction of insolation to the vehicle on the road, and
estimating the risk level based on the insolation direction information.

* * * * *